United States Patent [19]

Harper

[11] 4,239,857

[45] Dec. 16, 1980

[54] PROCESS FOR PRODUCING SOLID OR MICROCELLULAR POLYURETHANE ELASTOMERS HAVING IMPROVED GREEN STRENGTH

[75] Inventor: Bill D. Harper, Charleston, W. Va.

[73] Assignee: Union Carbide Corporation, New York, N.Y.

[21] Appl. No.: 920,458

[22] Filed: Jun. 29, 1978

[51] Int. Cl.$^3$ .................. C08G 18/14; C08G 18/24; C08G 18/79

[52] U.S. Cl. .................. 521/121; 521/160; 521/161; 528/58; 528/73

[58] Field of Search .................. 521/121, 160–161; 528/58, 73, 67

[56] References Cited

U.S. PATENT DOCUMENTS

| | | | |
|---|---|---|---|
| 2,834,748 | 5/1958 | Bailey et al. | 260/42 |
| 2,917,480 | 12/1959 | Bailey et al. | 260/42 |
| 3,505,377 | 4/1970 | Morehouse | 260/448.2 |
| 3,883,571 | 5/1975 | Allport et al. | 260/453 AM |
| 3,905,925 | 9/1975 | Vervloet | 260/2.5 BD |
| 3,907,780 | 9/1975 | Hughes | 521/161 |
| 3,945,981 | 3/1976 | Robertson | 528/58 |
| 3,975,317 | 8/1976 | Russo | 521/121 |
| 4,067,831 | 1/1978 | Wasilczyk | 521/121 |
| 4,101,471 | 7/1978 | Russo | 521/121 |

FOREIGN PATENT DOCUMENTS 1478644 4/1967 France .
1220471 1/1971 United Kingdom .
1341028 12/1973 United Kingdom .

OTHER PUBLICATIONS

*Plastics Engineering*, Mar. 1977, pp. 39–42.
*Plattics Technology*, Jul. 1976, pp. 67–70.
*Plastics Technology*, Jul. 1977, pp. 117–120.
*Rubber Age*, vol. 7, 1975, pp. 46–48.

*Primary Examiner*—H. S. Cockeram
*Attorney, Agent, or Firm*—Richard J. Gallagher

[57] ABSTRACT

This invention relates to a process for producing solid and microcellular polyether polyurethane elastomers by rapid processing technology wherein the resulting elastomers have improved "green strength" (cracking resistance). In the process, dialkyltin dimercaptide carboxylic acid ester is employed as the sole urethane catalyst in higher-than-normal amounts. The process is particularly suitable for use in the rapid processing technology known as Reaction Injection Molding (RIM).

37 Claims, No Drawings

PROCESS FOR PRODUCING SOLID OR MICROCELLULAR POLYURETHANE ELASTOMERS HAVING IMPROVED GREEN STRENGTH

BACKGROUND AND DESCRIPTION OF THE PRIOR ART

Recently, significant advances have been made in the production of polyurethane elastomers. Rapid processing times of three minutes or less are known to be obtainable by simultaneously reacting and forming polyurethane elastomer formulations using a process such as, for example, the Reaction Injection Molding (RIM) process, to produce cellular or solid elastomers. Since the "in-mold" time for a process such as RIM is small compared to that for conventional casting technology, curing of the elastomer is generally incomplete at the time of separation of the elastomer from the mold ("demolding") when conventional organotin catalysts (e.g., dibutyltin dilaurate) are employed in typical catalytic amounts. Attempts to increase the catalyst loading of conventional catalysts in order to provide faster curing result in a mold filling problem since higher conventional catalyst levels cause premature gelation of the reaction mixture.

Certain organotin catalysts are known as "delayed action" catalysts inasmuch as they provide delayed catalysis of a polyurethane reaction mixture. By way of illustration, such catalysts are described for use inter alia in the RIM process in the following trade literature references: (a) "Additives for Plastics-Polyurethane Catalysts", *Plastics Engineering*, March 1977, pp. 39–42; and (b) "Urethane Catalysis: Trimer Foams Spur R&D", *Plastic Technology*, July 1976, pp. 67–70. Delayed action organotin and organomercurial catalysts are described as suitable in the RIM process when used in conjunction with an amine co-catalyst in "Urethane Catalysts: Focus on Delayed Action", *Plastics Technology*, July 1977, pp. 117–120.

It has now been found that a process employing higher-than-normal amounts of a particular delayed-action organotin catalyst, namely dialkyltin dimercaptide carboxylic acid ester, in a process such as RIM provides process advantages in the production of solid and microcellular polyether polyurethane elastomers. First, the increased loading of dialkyltin dimercaptide carboxylic acid ester makes it possible to avoid the necessity of employing expensive amine catalysts. Second, there is no mold filling problem in view of the delayed action property of dialkyltin dimercaptide carboxylic acid ester. Third, the resulting elastomers exhibit enhanced "green strength" (cracking resistance) upon demolding.

SUMMARY OF THE INVENTION

This invention is based on the discovery that solid or microcellular polyether polyurethane elastomers having improved green strength can be produced using rapid processing such as RIM when dialkyltin dimercaptide carboxylic acid ester is employed as the primary catalyst in higher-than-normal amounts in the elastomer formulation. This was unexpected in view of the ineffectiveness of dialkyltin dimercaptide carboxylic acid ester in providing adequate green strength when used in rapid processing in conventionally-employed amounts and in view of the possible mold filling problem associated with increased amounts of dialkyltin dimercaptide carboxylic acid ester when employed in conjunction with amine co-catalysts. In accordance with this invention, a process for the rapid production of solid or microcellular elastomers is provided which comprises forming and curing a reaction mixture containing:

(a) a polyether polyol, (b) a diol extender selected from the group consisting of short-chain alkane diols, short-chain cycloaliphatic diols, and short-chain oxyalkylene glycols, (c) an organic polyisocyanate in an amount that provides from 0.8 to 1.3 isocyanato groups per active-hydrogen group in the reaction mixture, (d) from about 1.5 to about 8 times a catalytic amount of a dialkyltin dimercaptide carboxylic acid ester catalyst of the formula:

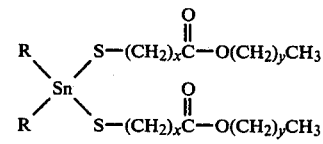

wherein R is an alkyl group selected from the group consisting of methyl, butyl and octyl, x is an integer of from 1 to 4 and y is an integer of from 1 to 10, said reaction mixture containing from 95 to 25 parts by weight of (a) and from 5 to 75 parts by weight of (b) per 100 parts by weight of (a) and (b).

When a microcellular elastomer is desired, the reaction mixtures used in the process of the present invention also include:

(e) a blowing agent in an amount sufficient to produce a microcellular structure in the elastomer.

The invention also relates to the elastomers produced by the above-described process. The elastomers are useful in the production of automotive body panels, tractor and snowmobile bodies and the like.

Although the process of the present invention is useful for any rapid processing technology such as, for example, rapid casting technology, it is particularly useful for Reaction Injection Molding (RIM) where in-mold times of one minute or less are not uncommon.

DESCRIPTION OF THE PREFERRED EMBODIMENTS

The polyether polyols useful in the process of the present invention include the alkylene oxide adducts of polyhydroxyalkanes such as, for example, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6- and 1,8-dihydroxyoctane, 1,10-dihydroxydecane, glycerol, 1,2,4-trihydroxypropane and the like; and those adducts of diethylene glycol, triethylene glycol, tetraethylene glycol, dipropylene glycol, tripropylene glycol, tetrapropylene glycol, d-butylene glycol, as well as the high molecular weight polyoxyethylene glycols, high molecular weight polyoxypropylene glycols, mixed ethylene-propylene glycols, mixed polyoxypropylene-polyoxyethylene glycols, and the like. The preferred polyether polyols are polyoxypropylene-polyoxyethylene polyols having a functionality of from 2 to about 4 (most preferably from 2 to about 3). In the preferred embodiment, the propylene oxide and ethylene oxide may be incorporated into the polyol as a mixed monomer feed or as block copolymer. The useful polyols within the scope of the preferred embodiment have from about 5 to about 60 weight percent ethylene oxide content and from about 95 to about 40 weight percent propylene oxide based on the total weight of ethylene oxide and propylene oxide in the polyol, of which from about 5 to about 25 weight percent ethylene oxide is added as a cap. These ethylene oxide capped (—OC₂H₄OH terminated) polyols are particularly useful in the present invention because of their increased reactivity over non-capped propylene oxide-ethylene oxide or propylene oxide polyols, thus providing decreased demold times that are especially suitable for the RIM technique.

The polyether polyols useful in the present invention can also be polymer/polyether polyols. These polymer/polyols are produced from the above-described polyether polyols and monomers such as hydrocarbon olefins (e.g., styrene, chlorostyrene), olefinic nitriles (e.g., acrylonitrile, methacrylonitrile), alkenyl esters of alkanoic acids (e.g., vinyl acetate, vinyl propionate, vinyl butyrate), alkyl acrylates (e.g., methyl acrylate and ethyl acrylate), alkyl methacrylates (e.g., methyl methacrylate and ethylmethacrylate), unsaturated aliphatic acids (e.g., acrylic acid and methacrylic acid). The preferred olefin is acrylonitrile alone or mixed with styrene. Preferably, the polymer component is formed in situ by polymerizing one or more polymerizable monomers in the polyol.

The techniques for preparing polymer/polyols are well known, and any known technique may be employed. The polymer/polyols useful in the present invention are preferably produced by utilizing the process set forth in co-pending application Ser. No. 417,487, filed Nov. 20, 1973, and incorporated herein by reference. In accordance with that process, a low monomer to polyol ratio is maintained throughout the reaction mixture during the process of the reaction. This is achieved by employing process conditions that provide for rapid conversion of monomer to polymer. In practice, a low monomer to polyol ratio is maintained, in the case of semi-batch and continuous operation, by control of the temperature and mixing conditions, and, in the case of semi-batch operation, by slowly adding the monomers to the polyol.

The polyether polyol employed in this invention is preferably a liquid that has a molecular weight of at least 1300 (preferably from about 2,000 to about 8,400) and that has a hydroxyl number of from about 20 to about 120 (preferably from about 20 to about 50 when microcellular elastomers are being produced). When the polyether polyol is a polymer/polyether polyol, the polymer has a molecular weight of at least about 5000. The polymer component is dissolved or dispersed in the polyol component.

Any of the known short chain alkane diol, cycloaliphatic diol, or oxyalkylene glycol chain extenders having a backbone of from 2 to 6 carbon atoms, may be utilized in the process of forming the elastomers of the present invention. Useful chain extenders include 1,3-propanediol; 1,4-butanediol; 1,5-pentanediol; 1,6-hexanediol; ethylene glycol; and diethylene glycol. Also useful are the 2 to 4 mole ethylene oxide and/or propylene oxide adducts of hydroquinone and aniline. The preferred chain extenders are 1,4-butanediol and ethylene glycol.

The organic polyisocyanates used in the manufacture of polyether polyurethanes are known to the art and any such reactants are suitably employed in the practice of the present invention. Among such suitable polyisocyanates are those represented by the general formula:

$$Q(NCO)_i$$

wherein i has an average value of at least 2 and is usually no more than 6, and Q represents an aliphatic, cycloaliphatic or aromatic radical which can be unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene or aralkylene radical including corresponding halogen- and alkoxy-substituted radicals. Typical examples of such polyisocyanates for use in preparing the polyurethanes of this invention are any of the following including mixtures thereof: 1,6-hexamethylenediisocyanate; 1,4-tetramethylene diisocyanate; bis(2-isocyanatoethyl)fumarate; 1-methyl-2,4-diisocyanatocyclohexane; methylene-4,4'-diphenyldiisocyanate, commonly referred to as "MDI"; phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate and 6-isopropyl-1,3-phenylenediisocyanate; 2,4-tolylene diisocyanate and 2,6-tolylene diisocyanate including mixtures of these two isomers as well as crude tolylene diisocyanate; isophoronediisocyanate; methylene-4,4'-dicyclohexyldiisocyanate; durylene diisocyanate; triphenylmethane-4,4',4"-triisocyanate; and other organic polyisocyanates known to the polyurethane art. Of the aforesaid types of polyisocyanates, those containing aromatic nuclei are generally preferred.

Also useful as a polyisocyanate reactant is so-called "liquid MDI" which comprises a major amount of MDI and a minor amount of:

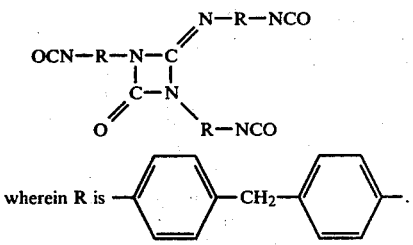

"Liquid MDI" is available commercially as ISONATE 143L (The Upjohn Company).

Also useful as polyisocyanate reactants are polymeric isocyanates having units of the formula:

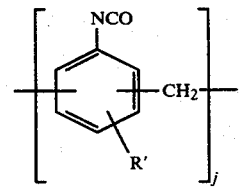

wherein R' is hydrogen and/or lower alkyl and j has an average value of at least 2.1. Usually, the lower alkyl radical is methyl and j has an average value no higher than about 4. Particularly useful polymeric aryl isocyanates of this type are the polyphenylmethylene polyisocyanates produced by phosgenation of the polyamine obtained by acid-catalyzed condensation of aniline with formaldehyde. They are low viscosity (50–500 centipoises at 25° C.) liquids having average isocyanato functionalities in the range of about 2.00 to about 3.2 or higher, and free—NCO contents of from about 25 to about 35 weight percent, depending upon the specific aniline-to-formaldehyde molar ratio used in the polyamine preparation. A suitable polymeric isocyanate of this type for use in the practice of this invention includes that available commercially as PAPI 901 (The Upjohn Company).

Other useful polyisocyanates are quasi-prepolymers produced by reacting an alkane diol (e.g., 1,3-propanediol), an oxyalkylene glycol (e.g., dipropylene glycol), or one or more of the above-mentioned polyether polyols, with an excess of polyisocyanate (e.g., MDI). Procedures for preparing quasi-prepolymers are disclosed in French Patent No. 1,478,664 and U.S. Pat. Nos. 3,883,571 and 3,905,925, incorporated herein by reference. The quasi-prepolymers useful in this invention have a free—NCO content of at least about 15 weight percent. Useful quasi-prepolymers include those available commercially as ISONATE 181 (The Upjohn Company) and MONDUR PF (Mobay Chemical Corporation).

Still other useful polyisocyanate reactants include tolylene diisocyanate residues obtained from the manufacture of the 2,4- and 2,6- isomers of tolylene diisocyanates, and having a free -NCO content of from about 30 to about 50 weight percent. For example, as is known, tolylene diisocyanate is commercially made by reacting toluene and nitric acid to form the 2,4- and 2,6-dinitrotoluene isomers, hydrogenating and then phosgenating, typically in a solvent such as dichlorobenzene, to provide the conventional mixture of 80 percent 2,4-tolylene diisocyanate and 20 percent 2,6-tolylene diisocyanate. After removal of the solvent, the crude product undergoes a further evaporation in a still, with the refined or pure tolylene diisocyanate coming over. The evaporator tails remaining are black in color and extremely viscous, often solid, materials. It is the evaporator tail material which is commonly referred to as tolylene diisocyanate residue.

On a combined basis, the polyol reactant and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent is from 0.8 to 1.3 equivalents of —NCO per equivalent of active hydrogen. This ratio is known as the Isocyanate Index and is often also expressed as a percent of the stoichiometric amount of polyisocyanate required to react with total active hydrogen.

The dialkyltin dimercaptide carboxylic acid ester catalyst is employed in an amount of from about 1.5 to about 8 times a catalytic amount, where the term "catalytic amount" denotes the amount of catalyst necessary to produce a satisfactory curing of the elastomer. Preferably, the catalyst is employed at a level of from about 0.200 parts by weight to about 0.400 parts by weight per 100 parts by weight of the active hydrogen-containing components in the reaction mixture. The preferred catalyst is dimethyltin dimercaptide carboxylic acid ester.

When it is desired to produce a microcellular elastomer according to the process of the invention, a blowing agent is employed. Useful blowing agents include any compound capable of generating an inert gas under the conditions used to cure the elastomer (e.g., by reaction to produce a gas or by volatilization). Suitable blowing agents include water, $N_2$, $CO_2$ and volatile halocarbons (especially chlorocarbons and chlorofluorocarbons) such as trichloromonofluoromethane, dichlorodifluormethane, dichloromonofluormethane, dichloromethane, trichloromethane, bromotrifluoromethane, chlorodifluoroethane, chloromethane, 1,1-dichloro-1,1-difluoromethane,1,1-difluoro 1,2,2-trichloroethane, chloropentafluoroethane, 1-chloro-1-fluoroethane, 1-chloro-2-fluoroethane, 1,1,2-trifluoroethane, 2-chloro-1,1,2,3,3,4,4,-heptafluorobutane, hexafluorocyclo-butane and octafluorobutane. Other useful blowing agents include low-boiling hydrocarbons such as butane, pentane, hexane, cyclohexane and the like. The amount of the blowing agent employed is determined by the desired elements of the microcellular elastomer to be produced. Microcellular elastomers generally have densities of 20 to 70 pounds per cubic foot and such densities can be achieved by employing from 1 to 20 parts by weight of a blowing agent (such as methylene dichloride or trichloromonofluoromethane) per 100 parts by weight of the active hydrogen-containing components in the reaction mixture.

It is also within the scope of the invention to employ small amounts, e.g., about 0.001% to 5.0% by weight, based on the total reaction mixture, of a foam stabilizer. Useful stabilizers are block copolymer surfactants, including non-ionic polyoxyalkylene block copolymers, such as polyoxyethylene-polyoxypropylene block copolymers. Also useful are "hydrolyzable" polysiloxane-polyoxyalkylene block copolymers such as the block copolymers described in U.S. Pat. Nos. 2,834,748 and 2,917,480. Another useful class of emulsifiers are the "nonhydrolyzable" polysiloxane-polyoxyalkylene block copolymers such as the block copolymers described in U.S. Pat. No. 3,505,377; U.K. Pat. No. 1,341,028 and British Pat. No. 1,220,471. The latter class of copolymers differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer with the remainder being polyoxyalkylene polymer.

If desired, other additional ingredients can be employed in minor amounts in producing the polyurethane elastomers in accordance with the process of this invention. Illustrative of such additives that can be employed are: fillers; dyes; pigments; anti-oxidation agents; amine co-catalysts; and the like. The amine co-catalyst, if used, is present in an amount of less than about 0.2 parts by weight per 100 parts by weight of the active hydrogen-containing components in the reaction mixture. Where a particular end use application requires a relatively high Shore D hardness, the elastomer formulation could include suitable amounts of any conventional modulus-enhancing filler.

The elastomers of the present invention may be formed into the desired final product by any known technique. However, it is preferred to prepare the formed elastomers according to the technique known as reaction injection molding or liquid reaction molding. This technique is described in *Rubber Age,* Volume 7, pages 46 to 48 (1975). When applying this technique to the present invention, demolding times as low as 15 seconds per part can be achieved in contrast to the 60 seconds or so demolding time typically required in present commercial applications. A suitable process sequence is as follows:

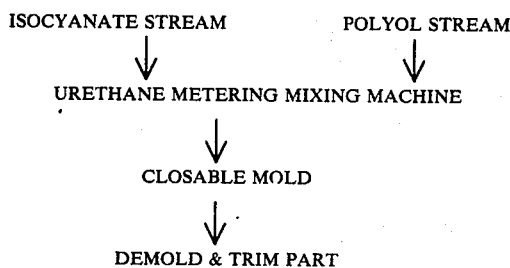

ISOCYANATE STREAM    POLYOL STREAM
↓                     ↓
URETHANE METERING MIXING MACHINE
↓
CLOSABLE MOLD
↓
DEMOLD & TRIM PART

The microcellular and solid elastomers produced in accordance with the present invention are useful in the production of automotive exterior body panels, tractor and snowmobile bodies, and the like.

As used herein, "elastomer" denotes an elastic composition which when solidified has a percent elongation value at the break point of greater than 50 percent.

The following Examples are illustrative of, but are not intended to limit, the present invention.

EXPERIMENTAL

The following experimental description illustrates the present invention. In the experimental description, the following abbreviations are used:

| Abbreviation | Meaning |
|---|---|
| Polymer/Polyol I | A polymer/polyol containing about 16 weight percent in situ polymerized polyacrylonitrile in a base polyol. The base polyol is a glycerol-started poly(oxypropylene-oxyethylene)polyol having 15 weight percent ethylene oxide, added as a cap, based on the ethylene oxide plus propylene oxide in the polyol. The hydroxyl number of the base polyol was 27 and the molecular weight was about 4400. The functionality of the base polyol was about 2.1. |
| Isocyanate I | "Liquid MDI" - i.e., an isocyanate mixture comprising a major amount of 4,4'-diphenylmethane diisocyanate and a minor amount of 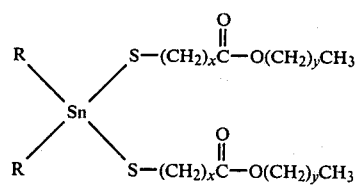 (ISONATE 143L, a product of The Upjohn Company). |

Catalyst I, Catalyst II and Catalyst III correspond to dialkyltin dimercaptide carboxylic acid esters of the formula:

$$\begin{array}{c} R \\ \diagdown \\ Sn \\ \diagup \\ R \end{array} \begin{array}{c} S-(CH_2)_x C-O(CH_2)_y CH_3 \\ \\ \\ S-(CH_2)_x C-O(CH_2)_y CH_3 \end{array}$$

(with C=O groups)

wherein R is an alkyl group selected from the group consisting of methyl, butyl and octyl, x is an integer of from 1 to 4 and y is an integer of from 1 to 10.
In Catalyst I, R is methyl; in Catalyst II, R is butyl;

| Abbreviation | Meaning |
|---|---|
| and in Catalyst III, R is octyl. | |
| Catalyst IV | Dibutyltin dilaurate |
| Extender I | 1,4-butanediol |
| Blowing Agent I | Trichloromonofluoromethane |
| Wt. percent (wt. %) | Weight percent |
| Parts | Parts by weight |
| pli | pounds per linear inch |
| psi | pounds per square inch gauge |
| EW(Equivalent Weight) | A unit basis for calculation of reactant weight ratios. It is the weight of a substance that theoretically combines with one gram of hydrogen or eight grams of oxygen, i.e., EW(Hydrogen) = 1 and EW(Oxygen) = 8. |
| Hydroxyl Number (OH No.) | A measure of the equivalent weight of a hydroxyl-containing substance. $OH\ No. = \frac{56.1 \times 1000}{EW}$. Expressed as milligrams of potassium hydroxide per gram of material. |
| FNCO(Free NCO) | A measure of the EW of an isocyanate-containing material. $\%\ FNCO = \frac{4.2}{EW} \times 1000$ |

Cream time denotes the interval of time in seconds until there is an appearance of a creamy color in the stirred foam formulation.

Tack-free time denotes the interval of time in seconds for the elastomer to become free of stickiness or tackiness.

Procedure A—RIM Technique for Preparation of Urethane Elastomers.

One tank (Tank 1) of a pilot plant-scale RIM machine was charged with a mixture containing 85 parts of Polymer/Polyol I and 15 parts of Extender I per 100 parts of Polymer/Polyol I plus Extender I. Into Tank 1 was also charged the selected amount of the catalyst specified in Table I below. Into the other tank (Tank 2) of the RIM machine was charged a mixture containing 96 parts of Isocyanate I and 4 parts of Blowing Agent I per 100 parts of Isocyanate I plus Blowing Agent I in Tank 2. Metering pumps from each tank were used to deliver 1.7 parts from Tank 1 for each 1.0 part from Tank 2 (Isocyanate Index 102–104) into the impingement mixing head of the RIM machine. After mixing in the mixing head, the reaction mixture was directed into a metal mold for forming the elastomer.

TABLE A

| Physical Test Methods | |
|---|---|
| Property | ASTM Method |
| Hardness, Shore D | D-2240 |
| Modulus, 100% | D-412 |
| Tensile Strength | D-412 |
| Elongation | D-412 |
| Flexural Modulus | D-790 |
| Die "C" Tear | D-624 |
| Heat Sag | -The amount a sample 1 inch wide with a 4 inch cantilvever droops when heated in an oven for 60 minutes at 250° F. |
| Cracking at demold | -A test for green strength which involves bending the formed elastomer back on itself immediately upon demolding to form a sharp crease. Visual observation is made of the extent of cracking that results on the outside surface |

TABLE A-continued

| Property | Physical Test Methods ASTM Method |
|---|---|
| of the crease. | |

EXAMPLES 1 to 6

Several elastomers were prepared using Procedure A by incorporating high catalyst loadings into the following formulation:

| Formulation A | |
|---|---|
| From Tank 1 | From Tank 2 |
| Polymer/Polyol I, parts 85 | Isocyanate I, parts 96 Index 102–104 |
| Extender I, parts 15 | Blowing Agent I, parts 4 |
| Catalyst (see Table I), varied | |

The following amounts of catalyst were employed: Catalyst I, 0.225 parts (Examples 1 and 2); Catalyst II, 0.225 parts (Example 3) and 0.260 parts (Example 4); Catalyst III, 0.225 parts (Example 5) and 0.305 parts (Example 6). It should be noted that, on a weight percent tin basis, 0.225 parts of Catalyst I is comparable to 0.260 parts of Catalyst II and 0.305 parts of Catalyst III. As a comparison, elastomers were produced using Catalyst I in a conventionally-employed amounts of 0.075 parts (Comparison A) and 0.15 parts (Comparisons B and C) in Formulation A using Procedure A.

Elastomer physical properties were measured in accordance with the test procedures listed in Table A. The results are given in Table I which follows.

catalysts of the instant invention. It is to be noted that no cracking at demold was observed for the elastomers of Examples 1, 5 and 6 despite the fact that rapid demold times ranging from 30 seconds (Example 1) to 15 seconds (Examples 5 and 6) were used. Slight cracking of the elastomers of Examples 2 and 4 resulted at a demold time of 15 seconds, and very slight cracking of the elastomer of Example 3 was obtainable at a demold time of 60 seconds. Comparable green strengths were achieved employing Catalyst I (Examples 1 and 2), Catalyst II (Examples 3 and 4) and Catalyst III (Examples 5 and 6). In contrast, when Catalyst I was employed at conventional levels (Comparisons A to C), cracking was observed at a demold time of 60 seconds. In general, except for the above-mentioned differences in green strengths, the physical properties of the elastomers of the Examples are comparable to those of Comparison B and superior to those of Comparison A.

Thus, the results as given in Table I indicate that the elastomers of the instant invention provide good green strength with rapid demold times of as low as 15 seconds, while other physical properties are comparable to, or superior to, those of elastomers produced using Catalyst I in conventional amounts.

EXAMPLES 7 to 9

Several elastomers were prepared using Procedure A with Catalyst I as the catalyst in an amount of 0.225 parts (Examples 7 to 9—see Table II). As a comparison, elastomers were produced using a conventional catalyst, Catalyst IV, in a conventional amount of 0.075 parts (Comparisons D and E) in Formulation A using Procedure A.

Elastomer physical properties were measured in accordance with the test procedures listed in Table A. The results are given in Table II which follows.

TABLE I

| | Elastomers Prepared Using Formulation A | | | | | | | | |
|---|---|---|---|---|---|---|---|---|---|
| Comparison/ Example | A | B | C | 1 | 2 | 3 | 4 | 5 | 6 |
| Catalyst I, pbw[1] | 0.075 | 0.15 | 0.15 | 0.225 | 0.225 | | | | |
| Catalyst II, pbw[1] | | | | | | 0.225 | 0.260 | | |
| Catalyst III, pbw[1] | | | | | | | | 0.225 | 0.305 |
| Formulation Properties | | | | | | | | | |
| Cream Time, sec. | 7 | 5 | 5 | 4 | 4 | 8 | 7 | 7 | 6 |
| Gel Time, sec. | 8 | 6 | 6 | 5 | 5 | 10 | 9 | 9 | 7 |
| Elastomer Properties[2] | | | | | | | | | |
| Demold Time, sec. | 60 | 60 | 60 | 30 | 15 | 60 | 15 | 15 | 15 |
| Post Cure Time, hr. | 1 | 1 | 1 | 1 | 1 | 1 | 1 | 1 | 1 |
| Hardness, Shore D | 44 | 50 | 53 | 51 | 51 | 48 | 51 | 55 | 56 |
| Modulus, 100%, psi | 1950 | 1875 | 1755 | 1895 | 1820 | 1780 | 1830 | 1675 | 1805 |
| Tensile Strength, psi | 2490 | 2720 | 2525 | 3030 | 2850 | 2785 | 2620 | 2590 | 3095 |
| Elongation, percent | 155 | 205 | 200 | 240 | 245 | 250 | 210 | 250 | 305 |
| Flexural Modulus, psi | | | | | | | | | |
| −20° F. | 40,100 | 40,000 | 47,500 | 46,900 | 48,100 | 64,100 | 65,200 | 74,100 | 73,200 |
| 75° F. | 16,000 | 16,800 | 19,100 | 19,500 | 20,800 | 28,500 | 25,800 | 26,600 | 28,400 |
| 158° F. | 6,900 | 7,400 | 8,600 | 9,300 | 9,500 | 12,100 | 10,800 | 12,300 | 12,200 |
| Flexural Modulus Ratio, | | | | | | | | | |
| −20° F./158° F. | 5.9 | 5.0 | 5.5 | 5.0 | 5.1 | 5.0 | 6.0 | 6.0 | 6.0 |
| Die "C" Tear, pli | 345 | 405 | 450 | 480 | 475 | 590 | 530 | 615 | 700 |
| Heat Sag, inches at 250° F. | 0.70 | 0.65 | 0.60 | 0.15 | 0.30 | 0.50 | 0.75 | 0.50 | 0.45 |
| Cracking at Demold | cracking | cracking | cracking | no cracking | slight cracking | very slight cracking | slight cracking | no cracking | no cracking |

[1]"pbw" denotes parts by weight, per 100 parts of active hydrogen-containing components in the reaction mixture.
[2]Test methods are given in Table A.

The results as presented in Table I clearly show the good green strengths as measured by cracking at demold that are obtainable using increased levels of the

TABLE II

| Elastomers Prepared Using Formulation A | | | | | |
|---|---|---|---|---|---|
| Comparison/Example | D | E | 7 | 8 | 9 |
| Catalyst I, pbw[1] | | | 0.225 | 0.225 | 0.225 |
| Catalyst IV, pbw[1] | 0.075 | 0.075 | | | |
| Formulation Properties | | | | | |
| Cream Time, sec. | 3 | 3 | 3 | 3 | 3 |
| Gel Time, sec. | 4 | 4 | 4 | 4 | 4 |
| Elastomer Properties[2] | | | | | |
| Demold Time, sec. | 60 | 30 | 60 | 30 | 15 |
| Post Cure Time, hr. | 1 | 1 | 1 | 1 | 1 |
| Hardness, Shore D | 54 | 57 | 58 | 58 | 57 |
| Modulus, 100%, psi | 1835 | 1870 | 1920 | 1950 | 1975 |
| Tensile Strength, psi | 2895 | 2810 | 2990 | 2955 | 2919 |
| Elongation, percent | 270 | 235 | 245 | 235 | 225 |
| Flexural Modulus, psi | | | | | |
| −20° F. | 77,800 | 76,000 | 71,300 | 74,200 | 73,700 |
| 75° F. | 28,200 | 24,000 | 24,700 | 25,100 | 30,300 |
| 158° F. | 13,700 | 12,600 | 10,800 | 11,300 | 12,500 |
| Flexural Modulus Ratio, | | | | | |
| −20° F./158° F. | 5.8 | 6.0 | 6.6 | 6.6 | 5.9 |
| Die "C" Tear, pli | 705 | 580 | 545 | 585 | 610 |
| Heat Sag, inches at 250° F. | 0.50 | 0.45 | 0.55 | 0.70 | 0.60 |
| Cracking at Demold | no cracking | slight cracking | no cracking | no cracking | no cracking |

[1] "pbw" denotes parts by weight, per 100 parts of active hydrogen-containing components in the reaction mixture.
[2] Test methods are given in Table A.

The results as presented in Table II show that, except for green strength, the elastomers of Examples 7 to 9 and Comparisons D and E provided comparably good physical properties. As demold time was decreased from 60 seconds in Comparison D to 30 seconds in Comparison E, green strength changed from "no cracking" to "slight cracking" at demold. In contrast, the elastomers of Examples 7 to 9 provided "no cracking" at demold times ranging from 60 seconds to 15 seconds.

What is claimed is:

1. A process for producing a solid or microcellular polyether polyurethane elastomer having improved green strength which comprises forming and curing a reaction mixture containing:
   (a) a polyether polyol,
   (b) a diol extender selected from the group consisting of short-chain alkane diols, short-chain cycloaliphatic diols, and short-chain oxyalkylene glycols,
   (c) an organic polyisocyanate in an amount that provides from 0.8 to 1.3 isocyanato groups per active-hydrogen group in the reaction mixture, wherein said organic polyisocyanate comprises a major amount of 4,4'-diphenylmethane diisocyanate and a minor amount of

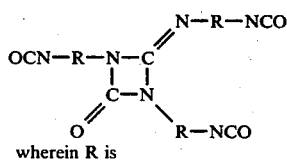

wherein R is

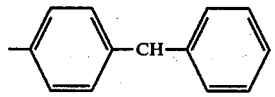

(d) from about 0.200 to about 0.400 parts by weight per 100 parts by weight of the active hydrogen-containing components in the reaction mixture of a dialkyltin dimercaptide carboxylic acid ester catalyst of the formula:

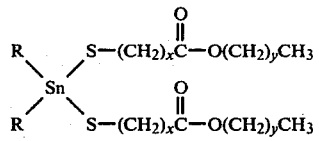

wherein R is an alkyl group selected from the group consisting of methyl, butyl and octyl, x is an integer of from 1 to 4 and y is an integer of from 1 to 10, said catalyst being present in from about 1.5 to about 8 times a catalytic amount,
said reaction mixture containing from 95 to 25 parts by weight of (a) and from 5 to 75 parts by weight of (b) per 100 parts by weight of (a) and (b), with the proviso that when a microcellular polyether polyurethane is being produced, the reaction mixture also contains:
   (e) a blowing agent in an amount sufficient to produce a microcellular structure in the elastomer.

2. The process of claim 1 wherein the polyether polyurethane elastomer is microcellular.

3. A microcellular elastomer provided by the process of claim 2.

4. The process of claim 2 wherein the dialkyltin dimercaptide carboxylic acid ester catalyst is dimethyltin dimercaptide carboxylic acid ester.

5. A microcellular elastomer produced by the process of claim 4.

6. The process of claim 2 wherein the dialkyltin dimercaptide carboxylic acid ester catalyst is dibutyltin dimercaptide carboxylic acid ester.

7. A microcellular elastomer produced by the process of claim 6.

8. The process of claim 2 wherein the dialkyltin dimercaptide carboxylic acid ester catalyst is dioctyltin dimercaptide carboxylic acid ester.

9. A microcellular elastomer produced by the process of claim 8.

10. The process of claim 2 wherein the polyether polyol is a polymer/polyether polyol.

11. A microcellular elastomer produced by the process of claim 10.

12. The process of claim 2 wherein the extender is a short-chain alkane diol.

13. A microcellular elastomer produced by the process of claim 12.

14. The process of claim 12 wherein the alkane diol is 1,4-butanediol.

15. A microcellular elastomer produced by the process of claim 14.

16. The process of claim 2 wherein the extender is a short-chain cycloaliphatic diol.

17. A microcellular elastomer produced by the process of claim 16.

18. The process of claim 2 wherein the extender is a short-chain oxyalkylene glycol.

19. A microcellular elastomer produced by the process of claim 18.

20. The process of claim 1 wherein the polyether polyurethane elastomer is solid.

21. A solid elastomer produced by the process of claim 20.

22. The process of claim 20 wherein the dialkyltin dimercaptide carboxylic acid ester catalyst is dimethyltin dimercaptide carboxylic acid ester.

23. A solid elastomer produced by the process of claim 22.

24. The process of claim 20 wherein the dialkyltin dimercaptide carboxylic acid ester catalyst is dibutyltin dimercaptide carboxylic acid ester.

25. A solid elastomer produced by the process of claim 24.

26. The process of claim 20 wherein the dialkyltin dimercaptide carboxylic acid ester catalyst is dioctyltin dimercaptide carboxylic acid ester.

27. A solid elastomer produced by the process of claim 26.

28. The process of claim 20 wherein the polyether polyol is a polymer/polyether polyol.

29. A solid elastomer produced by the process of claim 28.

30. The process of claim 20 wherein the extender is a short-chain alkane diol.

31. A solid elastomer produced by the process of claim 30.

32. The process of claim 20 wherein the alkane diol is 1,4-butane diol.

33. A solid elastomer produced by the process of claim 32.

34. The process of claim 20 wherein the extender is a short-chain cycloaliphatic diol.

35. A solid elastomer produced by the process of claim 34.

36. The process of claim 20 wherein the extender is a short-chain oxyalkylene glycol.

37. A solid elastomer produced by the process of claim 36.

* * * * *